H. E. PENNYPACKER.
Seed-Planter.
No. 160,707. Patented March 9, 1875.
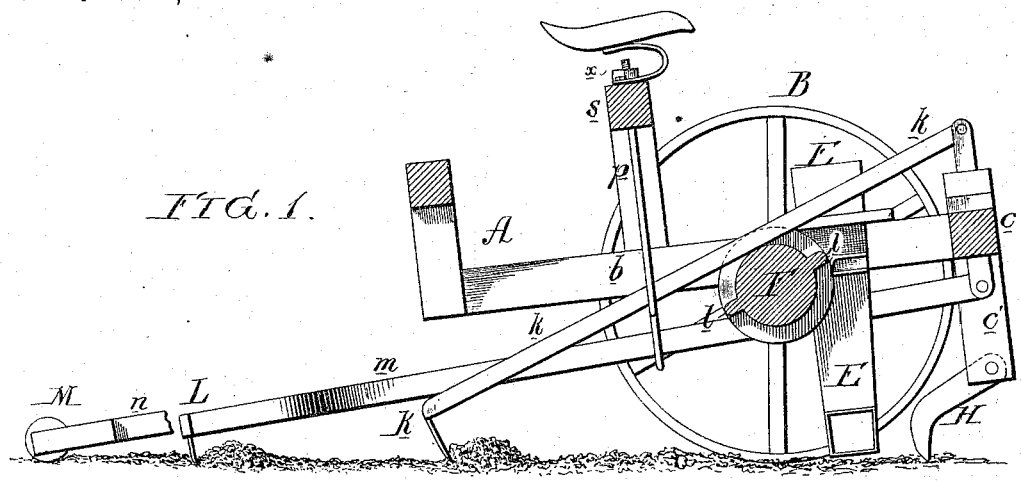

UNITED STATES PATENT OFFICE.

HERBERT E. PENNYPACKER, OF PHŒNIXVILLE, PENNSYLVANIA.

IMPROVEMENT IN SEED-PLANTERS.

Specification forming part of Letters Patent No. 160,707, dated March 9, 1875; application filed December 10, 1874.

*To all whom it may concern:*

Be it known that I, HERBERT E. PENNYPACKER, of Phœnixville, Chester county, Pennsylvania, have invented certain Improvements in Seed-Planters, of which the following is a specification:

The object of my invention is to construct a simple, cheap, and effective seed-planter, and this object I attain in the manner which I will now proceed to describe, reference being had to the accompanying drawing, in which—

Figure 1 is a vertical sectional view of my improved seed-planter; Fig. 2, a plan view of the same; Figs. 3 and 4, detached sectional views; and Fig. 5, an enlarged perspective view of part of the machine.

A is the frame of the machine, mounted upon two wheels, which are loose upon the axle D, the hubs of the wheels being furnished with teeth adapted to those of the clutches $a$ $a$, arranged to turn and slide on the axle, so that the latter can be thrown in or out of gear with the wheels by operating the said clutches. To one of the side frames $b$ of the machine is attached a seed-receptacle, E, and to the opposite side frame $b'$ is attached a receptacle, E', for fertilizers, both being provided with spouts, which reach almost to the surface of the ground. The seed-receptacle E is separated into chambers $d$ and $e$ by means of two slides, $f$ and $f'$, each of which has a perforation, $i$, these slides being operated at proper intervals by cams $h$ and $h'$ on a disk, F, attached to the axle D. The cams $h$ and $h'$ are so arranged on the disk that the upper slide $f$ will be first moved, so as to allow the seed to pass through its perforation into the chamber $e$, which is of a suitable size to contain the amount of seed necessary for each hill. When this chamber has been filled the slide $f$ will be closed by a suitable spring, and the slide $f'$ opened by one of the cams $h'$, thus allowing the seed to pass through the spout of the seed-receptacle to the ground. The fertilizer-receptacle E' has a single slide, $g$, operated by a cam, $g'$, on the disk F, the cams on the opposite sides of the said disk being so arranged in respect to each other that the fertilizing material and the seed will be deposited in the ground at the same time.

On referring to Fig. 4, which is a transverse section of the fertilizer-receptacle, it will be seen that the axle D projects into the corner of the said receptacle, and serves as an automatic stirrer for the guano or other fertilizer contained within the same.

The plow H for forming the furrow is attached to an extension, $c'$, of the front bar $c$ of the frame, and to the outer ends of this bar are attached marking-plows I I, for a purpose which will be readily understood without description.

A hoe, K, is attached to a bar, $k$, pivoted to the front bar $c$, and is arranged to be lifted at intervals by projections $l$ on the disk D, the effect of this movement of the hoe being to throw up a hill of earth over deposited seed in the same manner as when the ordinary hand-hoe is used. A rake, L, and a roller, M, are attached to curved arms $m$ and $n$, pivoted to the front bar $c$, and operate in relation to each other and to the hoe K, in a manner which needs no minute description here. The hoe K, rake L, and roller M are limited in their downward movement by means of adjustable rods $p$, extending through the cross-frame $s$, and adjustable by nuts $x$. (See Fig. 1.)

I claim as my invention—

1. The combination, in a seed-planter, substantially as described, of the pivoted hoe K, the disk F, and its projections $l$ $l$ for elevating the said hoe, and the adjustable rods $p$, for determining the extent of the downward movement of the same, all as and for the purpose set forth.

2. The combination, substantially as described, of the seed-receptacle E, and its slides $f$ and $f'$, with the disk F, and its cams $h$ and $h'$.

3. The fertilizer-receptacle E, the bottom of which is formed partly by the axle D and partly by the sliding plate $g$, substantially as and for the purpose set forth.

In testimony whereof I have signed my name to this specification in the presence of two subscribing witnesses.

HERBERT E. PENNYPACKER.

Witnesses:
 WM. C. PENNYPACKER,
 BENJAMIN MCFARLAN.